United States Patent [19]

Jayner

[11] 4,159,042
[45] Jun. 26, 1979

[54] AUTOMOTIVE ENERGY ABSORPTION, STORAGE AND RETRIEVAL SYSTEM

[76] Inventor: Stephen J. Jayner, 36-35 167 St., Flushing, N.Y. 11358

[21] Appl. No.: 824,323

[22] Filed: Aug. 12, 1977

[51] Int. Cl.² ............................................. B60K 9/00
[52] U.S. Cl. .............................. 180/54 R; 185/40 H
[58] Field of Search ........................ 180/54 R, 1 R; 185/40 H, DIG. 1

[56] References Cited

U.S. PATENT DOCUMENTS

| 837,815 | 12/1906 | Esch | 185/9 |
|---|---|---|---|
| 1,528,954 | 3/1925 | Shaw | 185/DIG. 1 |
| 2,137,574 | 11/1938 | Kromer | 180/1 R |
| 3,589,464 | 6/1971 | Katchamakoff | 180/54 R |
| 3,945,453 | 3/1976 | Black | 180/54 R |

Primary Examiner—Joseph F. Peters, Jr.
Assistant Examiner—Milton L. Smith

[57] ABSTRACT

An automotive energy absorption, storage and retrieval system consisting primarily of an elastomeric member or the like for absorbing and storing the energy of a moving vehicle when the vehicle is being decelerated, by stretching the elastomeric member, and for transmitting this stored energy, of the stretched elastomeric member, to enable the vehicle to be accelerated.

1 Claim, 1 Drawing Figure

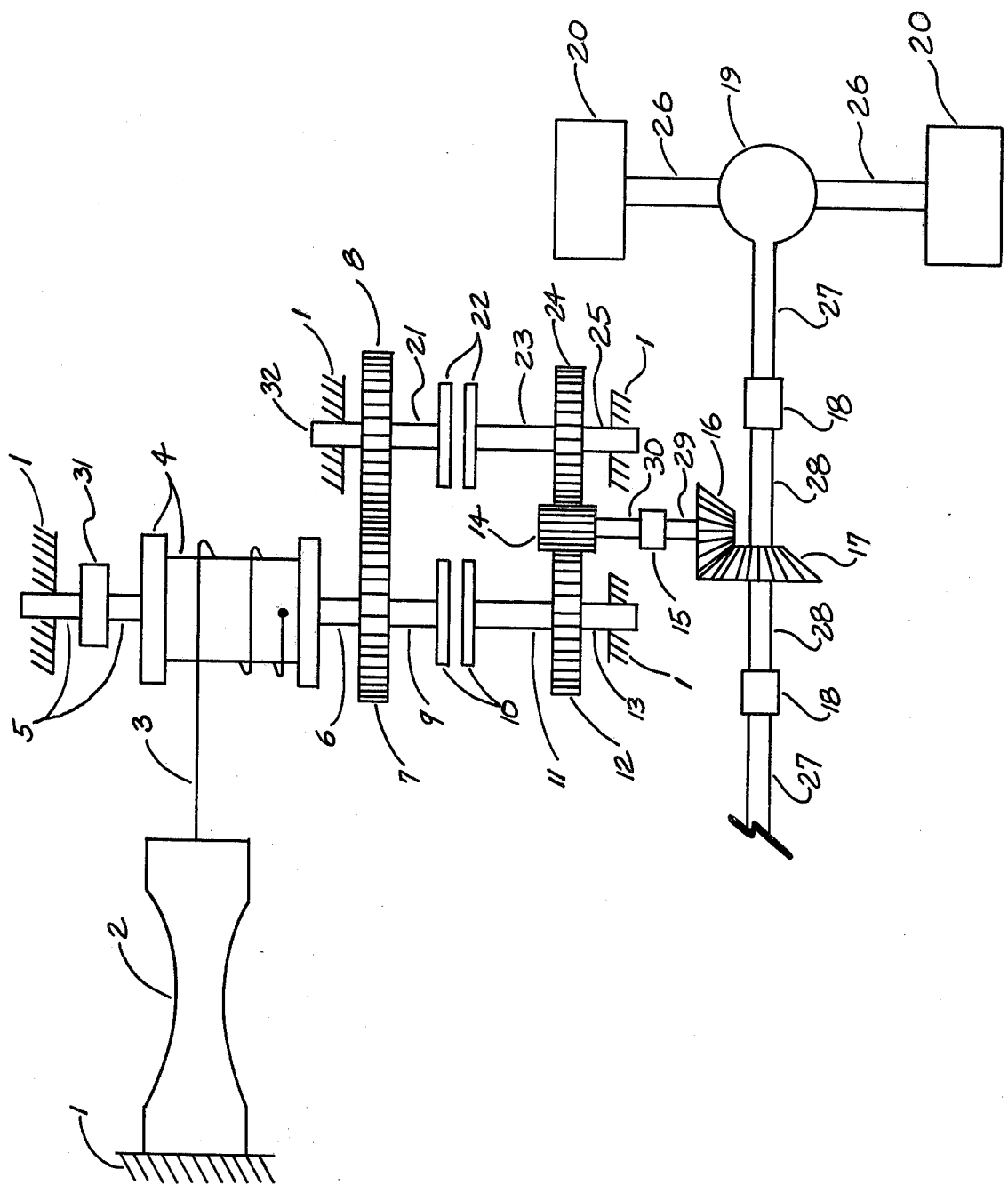

AUTOMOTIVE ENERGY ABSORPTION, STORAGE AND RETRIEVAL SYSTEM

This invention is an energy saving device that captures the energy of the moving vehicle during braking, stores this energy, and uses this energy to start the vehicle moving again.

The heart of the invention is a piece of elastomeric material such as rubber, either natural ral and/or synthetic, that is made to become stretched by having the kinetic energy of the vehicle's motion pull, by means of a cable, on the elastomer when a brake-mode clutch is engaged, thus absorbing the said kinetic energy, and slowing the vehicle to a stop. When the vehicle is desired to move, this absorbed kinetic energy in the form of the stretched elastomer is allowed to be transferred to the vehicle's power wheels, thus causing the wheels to rotate and moving the vehicle.

Prior Art for methods of absorbing the vehicle's kinetic energy during braking can be found in U.S. Pat. No. 2,137,574. Herein is disclosed a spring and air cylinder wherein the kinetic energy is used to tension a spring and compress air in a cylinder. This invention used a spring and air cylinder. The present invention utilizes an elastomeric material of rubber which can absorb approximately forty (40) times more the amount of energy a spring can absorb, for the same size. Also, rubber weighs much less than steel. Therefore it is seen that the present invention is different and an improvement over the cited invention in that the present invention claims use of rubber to absorb the kinetic energy, whereas the cited invention did not claim use of rubber, but claimed use of a spring and air cylinder.

Other U.S. Patents, namely Nos. 3,589,464 and 3,945,453 and 837,815 also use springs and not rubber, and the springs must be wound-up by an external source of power; that is, the springs do *not* absorb the kinetic energy of the moving vehicle during braking. The springs must be wound-up, and then the sole purpose for the spring is to power the vehicle. The present invention utilizes the energy due to braking the vehicle, and then employs the stretched rubber to power the vehicle.

U.S. Pat. No. 1,528,954 although employing an elastic member for powering the toy vehicle, does not use the vehicle's kinetic energy to stretch the elastic member, but rather requires the operator of the toy vehicle to pull on a cord to stretch the elastic member. Again, it requires an external source of power.

None of the above cited inventions utilize the vehicle's kinetic energy to stretch an elastomeric material such as rubber, and therefore this present invention is claimed to be new and an improvement over the earlier inventions.

It is understood that various modifications may be resorted to within the scope of the appended claim without departing from the spirit of the invention.

The accompanying drawing forms a part of the Specification.

The drawing shows a plan view of the apparatus consisting of gears, clutches, elastomeric element as rubber, and shafting connected to the vehicle's propeller shaft to absorb the vehicle's kinetic energy (kinetic energy is the energy some body has because of its velocity) during braking, to store this energy in the elastomeric rubber element, and to power the vehicle for a certain distance by use of this stored energy.

In the FIGURE, the apparatus works as follows:

For braking the moving vehicle, clutch 10 is engaged, while clutch 22 is disengaged. Because the vehicle is moving, the vehicle's propeller shaft 27 rotates. Shaft 27 is connected to shaft 28 by connector 18. The rotating shaft 28 causes bevel gear 17 to turn. The rotating bevel gear 17 is engaged with bevel gear 16 which causes shaft 29 to rotate. Shaft 30 is rotated by connector 15, and pinion 14, being engaged with gears 12 and 24, causes shafts 11 and 23 to rotate in the same directions. Shafts 13 and 25, being connected to gears 12 and 24 respectively, are supported by vehicle's chassis 1. With said clutch 10 engaged, shaft 9 is made to rotate causing gear 7 to rotate. Gear 8, being engaged to gear 7, rotates idly because said clutch 22 is disengaged. Shaft 21 is connected to clutch 22 and gear 8. Shaft 32 is connected to gear 8 and is supported by vehicle chassis 1. Shaft 6 is connected to gear 7 and cable spool 4. Rotating gear 7 causes shaft 6 to rotate which causes cable spool 4 to rotate. Shaft 5 is connected to cable spool 4 and is supported by vehicle chassis 1. Cable 3 is connected to cable spool 4 at one of the cable's end, and connected to elastomeric member 2 at its other end. Elastomeric member 2 is connected to the vehicle chassis 1 at its end, and at its other end, elastomeric member 2 is connected to said cable 3. Said rotating cable spool 4 causes cable 3 to wind up on cable spool 4, which causes tensioning or stretching of elastomeric member 2. Tensioning or stretching elastomeric member 2 causes said moving vehicle to be slowed and braked. When vehicle is stopped, brake 31 is applied which holds shaft 5 from rotating which holds cable spool 4 from rotating which holds cable 3 from unwinding from cable spool 4 which holds elastomeric member 2 tensioned, thus storing the absorbed kinetic energy of the previously moving vehicle. To accelerate the vehicle with the said stored kinetic energy. the clutch 22 is engaged, the clutch 10 is disengaged, the brake 31 is released and the following sequence of events occurs: In the FIGURE, the release of brake 31 allows the tensioned elastomeric member 2 to pull on cable 3 which, because brake 31 is released, causes cable spool 4 to rotate in a manner as to unwind cable 3. This rotation of cable spool 4 causes shaft 6 to rotate which causes gear 7 to rotate. Shaft 9 rotates idly because said clutch 10 is disengaged. Gear 8, being engaged with said rotating gear 7, rotates and causes said shaft 21 to rotate. Said engaged clutch 22 causes shaft 23 to rotate. Gear 24, being connected to rotating shaft 23, rotates and is connected to shaft 25, which causes shaft 25 to rotate. Shaft 25 is supported by vehicle chassis 1. Rotating gear 24, being engaged with pinion 14, causes shaft 30 to rotate. Rotating shaft 30, being connected to shaft 29 by connecter 15, causes shaft 29 to rotate. Bevel gear 16, being connected to rotating shaft 29, rotates and causes rotation of engaged bevel gear 17. Rotating bevel gear 17, being connected to shaft 28, causes shaft 28 to rotate. Rotating shaft 28, being connected to the vehicle's propeller shaft 27 by connector 18, causes vehicle's propeller shaft 27 to rotate turning vehicle's differential gears 19 which cause the vehicle's axle 26 to rotate and turn the vehicle'power wheels 20. Thus, the siad stored kinetic energy is used to accelerate the vehicle until said elastomeric member 2 becomes unstretched. Then the said clutch 22 is disengaged and the vehicle's engine powers the vehicle.

I claim:

1. An automotive energy absorption, storage and retrieval system for a vehicle having a chassis comprising: a bevel gear mounted on the propeller shaft, a second bevel gear mounted on a shaft extending at an angle to the propeller shaft and engaging said first mentioned bevel gear, a first pair of shafts extending parallel to the second mentioned shaft, a gear on each of the first pair of shafts, a pinion on the second mentioned shaft engaged with the gears on the shafts of the first pair of shafts; a second pair of shafts having each shaft in alignment with a respective one of the shafts of the first pair of shafts, a pair of selectively operable clutches, each clutch alternately connecting one of said second pair of shafts to the aligned shaft of the first pair of shafts, a gear on each shaft of the second pair of shafts, the gears on the second pair of shafts being engaged with each other, a cable spool connected to one shaft of the second pair of shafts, an elastomeric member of natural and/or synthetic rubber or the like connected at one end to the vehicle chassis, a cable connected to the other end of the elastomeric member and to the cable spool and adapted to be wound on the cable spool and a brake coupled to the cable spool, the clutches enabling energy to be transmitted from the propellor shaft to the cable spool to enable the cable to extend the elastomeric member to absorb and store energy when the vehicle is being decelerated and enabling energy to be transmitted from the elastomeric member to the propeller shaft to enable the vehicle to be accelerated, the cable spool brake acting to restrain movement of the cable spool and elastomeric member to permit the stored energy to be retained by the elastomeric member.

* * * * *